US010415798B2

(12) United States Patent
Herloski

(10) Patent No.: US 10,415,798 B2
(45) Date of Patent: Sep. 17, 2019

(54) DMD-BASED IMAGERS WITH MINIMIZED THERMAL LOADS IN AN OFF-STATE

(71) Applicant: Xerox Corporation, Norwalk, CT (US)

(72) Inventor: Robert P. Herloski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/880,154

(22) Filed: Jan. 25, 2018

(65) Prior Publication Data

US 2019/0226660 A1 Jul. 25, 2019

(51) Int. Cl.
*F21V 14/04* (2006.01)
*G02B 26/08* (2006.01)

(52) U.S. Cl.
CPC .......... *F21V 14/04* (2013.01); *G02B 26/0833* (2013.01)

(58) Field of Classification Search
None
See application file for complete search history.

(56) References Cited

U.S. PATENT DOCUMENTS

| | | | |
|---|---|---|---|
| 2007/0206390 A1* | 9/2007 | Brukilacchio | G02B 6/4298 362/555 |
| 2009/0168448 A1* | 7/2009 | Ma | G02B 6/0006 362/551 |
| 2014/0118818 A1* | 5/2014 | Nishina | G02B 17/08 359/364 |
| 2017/0138545 A1* | 5/2017 | Minor | F21K 9/60 |
| 2018/0024371 A1* | 1/2018 | Schwaiger | G02B 27/0927 372/29.01 |

* cited by examiner

*Primary Examiner* — Ashok Patel

(57) ABSTRACT

An apparatus is disclosed. For example, the apparatus may include an array of a plurality of micromirrors, a light source to provide a light input at a near symmetric angle relative to a normal angle of each one of the plurality of micromirrors in the array, and an optic adjuster to adjust an off-axis light output of the plurality of micromirrors in the array when the plurality of micromirrors is in an on-state.

20 Claims, 3 Drawing Sheets

DMD-BASED IMAGERS WITH MINIMIZED THERMAL LOADS IN AN OFF-STATE

The present disclosure relates generally to digital micromirror devices and, more particularly, to a DMD-based imager with minimized thermal loads in an off-state.

BACKGROUND

Digital micromirror devices (DMDs) are used to produce images. A DMD may be a binary light modulator, which consists of a rectangular array of square micromirrors that can be tilted around their diagonals into either one of two stable positions (e.g., an on-state or an off-state). When the DMD is powered on, the micromirrors can be tilted towards a light source. When the DMD is powered off, the micromirrors can be tilted away from the light source.

DMDs can be lightweight, compact, and extremely reliable devices that produce an image whose quality does not degrade over time. The DMDs can be tolerant over a wide range of temperatures and environmental conditions such as shock, radiation, vibration, and the like. As a result, the DMDs can be used in a variety of different devices. For example, DMDs can be used in devices such as televisions, scientific instrumentation such as spectrometers, personal computer (PC) projectors, and the like.

SUMMARY

According to aspects illustrated herein, there is provided an apparatus. One disclosed feature of the embodiments is an apparatus comprising an array of a plurality of micromirrors, a light source to provide a light input at a near symmetric angle relative to a normal angle of each one of the plurality of micromirrors in the array, and an optic adjuster to adjust an off-axis light output of the plurality of micromirrors in the array when the plurality of micromirrors is in an on-state.

Another disclosed feature of the present disclosure is another embodiment of an apparatus. In one embodiment, the apparatus comprises an array of a plurality of micromirrors, a light source to provide a light input at an approximately symmetric angle relative to a normal angle of each one of the plurality of micromirrors in the array, and an optic adjuster to adjust an off-axis light output of the plurality of micromirrors in the array when the plurality of micromirrors is in an on-state.

Another disclosed feature of the present disclosure is another embodiment of an apparatus. In one embodiment, the apparatus comprises an array of a plurality of micromirrors, a light source to provide a light input at an input angle between a range of angles, wherein the range of angles comprises approximately 0 degrees to 10 degrees relative to a normal angle of each one of the plurality of micromirrors in the array, and an optic adjuster to adjust an off-axis light output of the plurality of micromirrors in the array when the plurality of micromirrors is in an on-state.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses digital micromirror devices (DMDs) that have minimized thermal loads in an off-state. As discussed above, DMDs can be lightweight, compact, and extremely reliable devices that produce an image whose quality does not degrade over time. The DMDs can be tolerant over a wide range of temperatures and environmental conditions such as shock, radiation, vibration, and the like. As a result, the DMDs can be used in a variety of different devices. For example, DMDs can be used in devices such as televisions, scientific instrumentation such as spectrometers, and the like.

As noted above, a DMD may be a binary light modulator, which consists of a rectangular array of square micromirrors that can be tilted around their diagonals into either one of two stable positions (e.g., an on-state or an off-state). When the DMD is powered on, the micromirrors can be tilted towards a light source. When the DMD is powered off, the micromirrors can be tilted away from the light source.

Current DMD designs suffer from a large amount of energy absorption when the DMD is in an off-state. For example, in an off-state with a light input of 24 degrees, the DMD may have a 29% absorption. High rates of absorption can lead to over-heating of the DMD, premature failure, or other device malfunctions.

Embodiments of the present disclosure provide a DMD that minimizes thermal loads in the off-state. For example, a light source may provide light at an approximately symmetric or near-symmetric input angle. As a result, the percentage of absorption in the off-state can be reduced by as much as 50%, while maintaining an approximately equal amount of peak reflected efficiency in the on-state.

Figure 1:
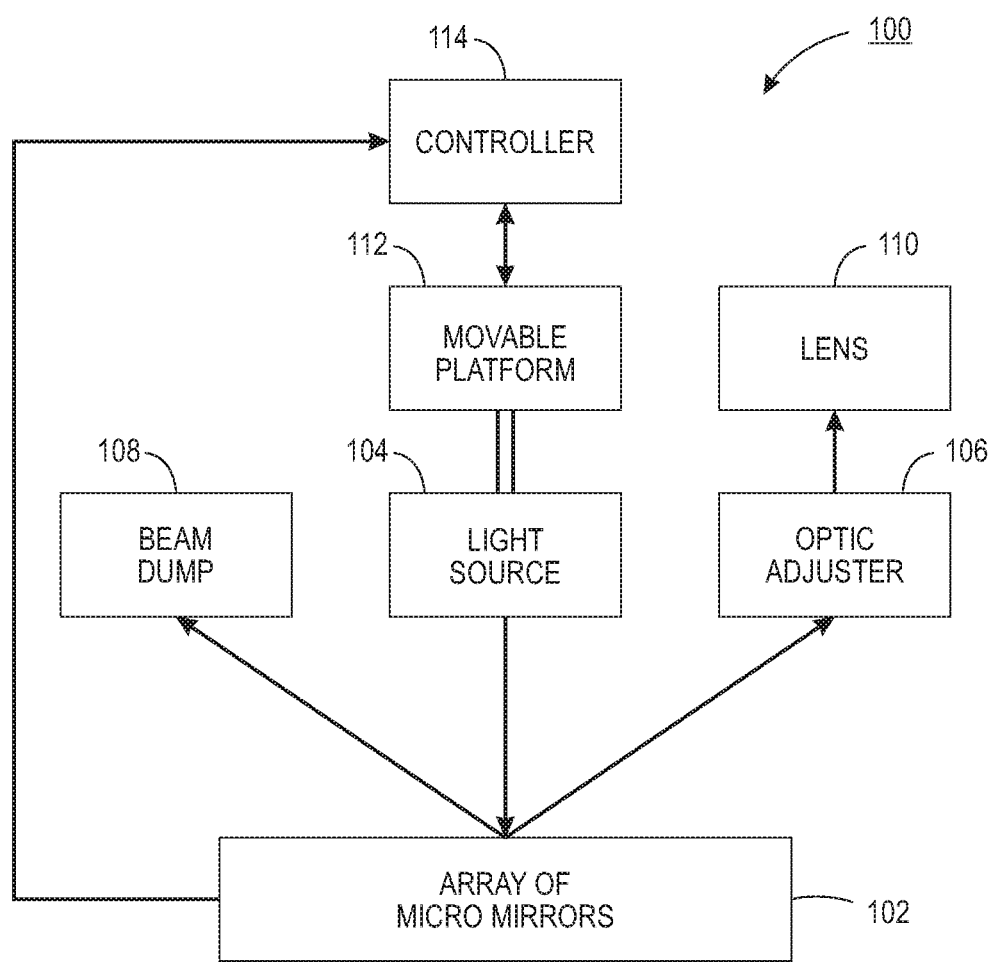
FIG. 1 illustrates a block diagram of an apparatus of the present disclosure.

FIG. 1 illustrates an example of an apparatus 100 of the present disclosure. The apparatus 100 may be a DMD that can be deployed as part of a television, spectrometer, or any other type of image generating device.

In one embodiment, the apparatus 100 may include an array of micromirrors 102, a light source 104, an optic adjuster 106, a beam dump 108, and a lens 110. In one embodiment, the apparatus 100 may also include a movable platform 112 coupled to the light source 104. A controller 114 may be communicatively coupled to the movable platform 112 and the array of micromirrors 102. A description of each of these components is discussed in further detail below.

Figure 2:
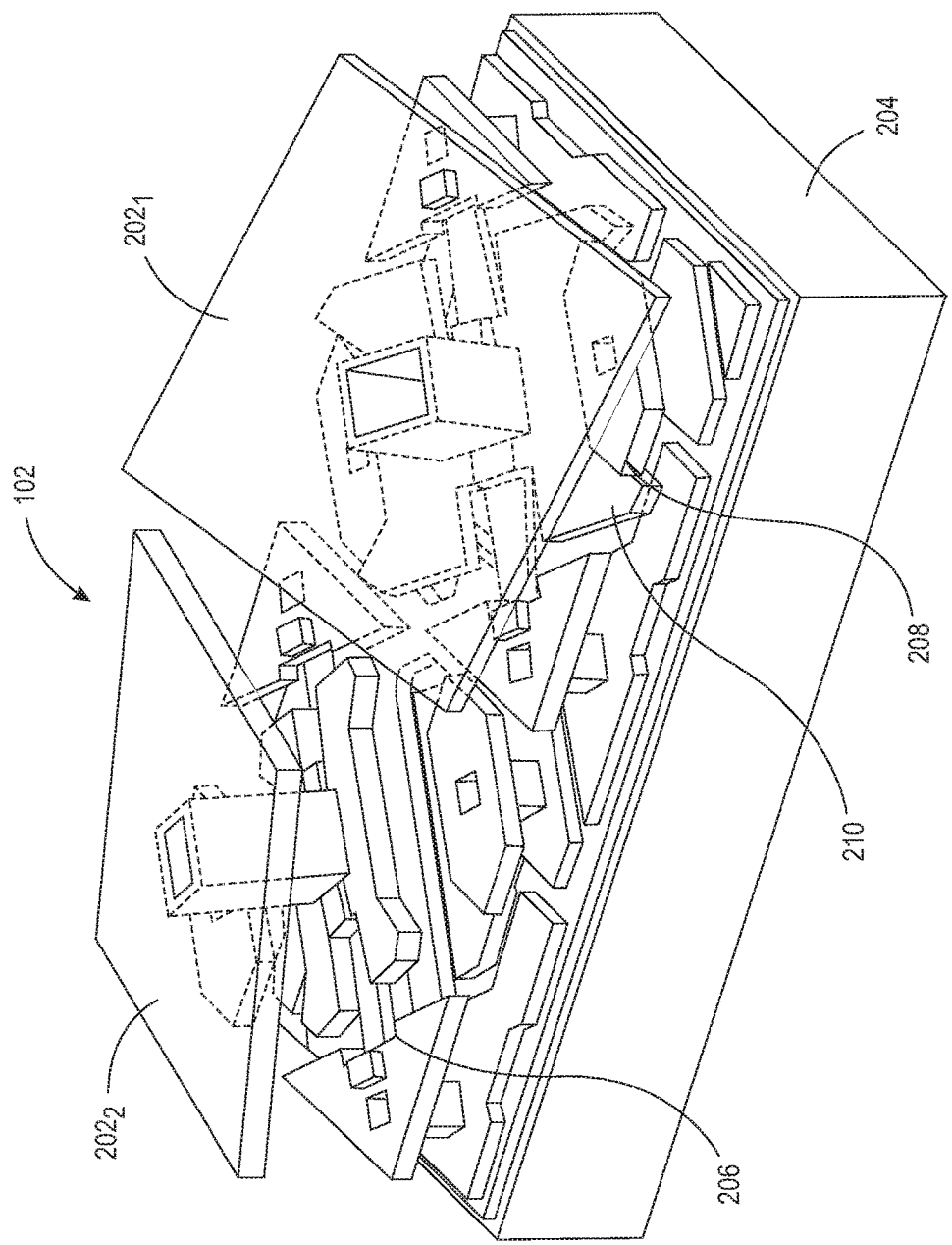
FIG. 2 illustrates an example array of micromirrors of the present disclosure.

FIG. 2 illustrates an example of the array of micromirrors 102. In one example, the array of micromirrors 102 may include micromirrors $202_1$ and $202_2$ (also referred to herein individually as a micromirror 202 or collectively as micromirrors 202). Although two micromirrors $202_1$ and $202_2$ are illustrated in FIG. 2, it should be noted that the array of micromirrors 102 may include any number of micromirrors.

In one embodiment, each one of the micromirrors $202_1$ and $202_2$ may include a complementary metal oxide semiconductor (CMOS) substrate 204. One or more electrodes 208 may be fabricated onto the CMOS substrate 204. The signaling to control the micromirrors $202_1$ and $202_2$ may be transmitted from the controller 114 to the micromirrors $202_1$ and $202_2$ via the one or more electrodes 208.

Each one of the micromirrors $202_1$ and $202_2$ may include a hinge 206 that allows the micromirrors $202_1$ and $202_2$ to rotate along a respective diagonal. Each one of the micromirrors $202_1$ and $202_2$ may also include a yoke 210 that is coupled to the hinge 206. The yoke 210 may provide support for each of the micromirrors $202_1$ and $202_2$.

It should be noted that FIG. 2 illustrates a simplified block diagram of the array of micromirrors 102 for ease of explanation. Each micromirror $202_1$ and $202_2$ may include additional components or devices that are not labeled or shown in FIG. 2.

In one embodiment, the controller 114 may control the state of the array of micromirrors 102. For example, the controller 114 may control the array of micromirrors 102 to be in an on-state or an off-state. The on-state may be defined as the micromirror $202_1$ being angled +12 degrees relative to the light source 104. The off-state may be defined as the micromirror $202_2$ being angled -12 degrees relative to the light source 104.

Figure 3:
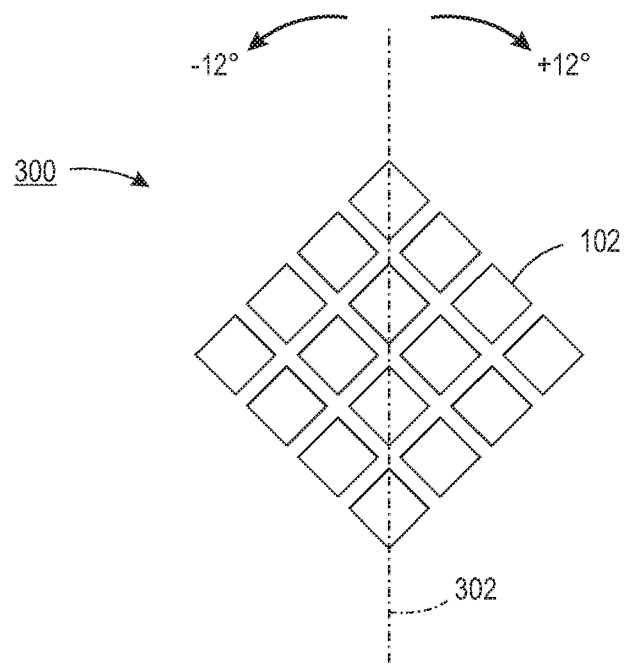
FIG. 3 illustrates a top view of an example array of the micromirrors of the present disclosure.

FIG. 3 illustrates a top view of the array of micromirrors 102. In one embodiment, an axis 302 illustrates an axis that the micromirrors 202 can rotate around. As illustrated in FIG. 2 above, the micromirrors 202 can rotate +12 degrees to an on-state or -12 degrees to an off-state around the axis 302.

Figure 4:
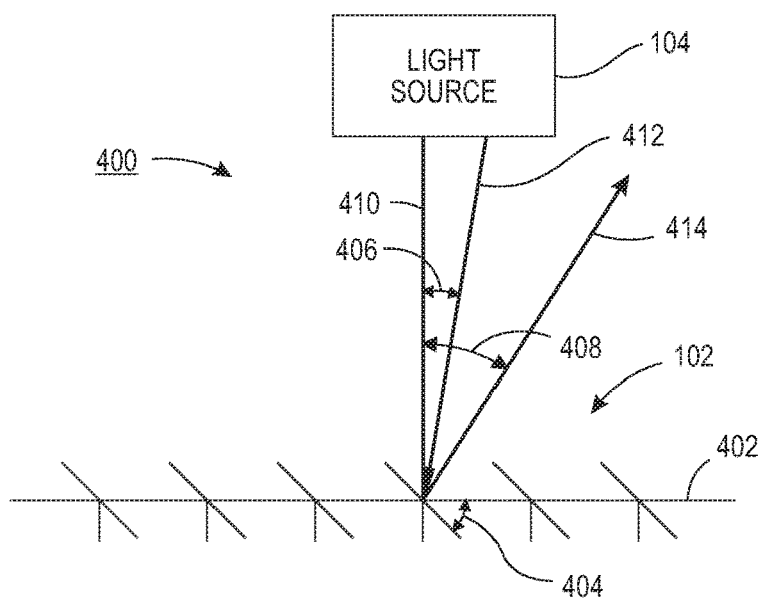
FIG. 4 illustrates a side view of an example array of micromirrors of the present disclosure.

FIG. 4 illustrates a side view of the array of micromirrors 102. In one embodiment, a horizontal axis 402 may be the relative axis to measure a tilt angle 404 of the micromirrors. For example, the tilt angle may be the +12 degrees relative to the horizontal axis 402 in the on-state or the -12 degrees relative to the horizontal axis 402 in the off-state. Positive angles may be below the horizontal axis 402 and negative angles may be above the horizontal axis.

In one embodiment, a line 410 may represent a normal angle relative to the array of micromirrors. In other words, the line 410 may represent 0 degrees and an angle 406 of a light input 412 may be measured relative to the normal angle represented by the line 410. Similarly, an angle 408 of an off-axis light output 414 may be measured relative to the normal angle represented by the line 410.

In one embodiment, positive angles may be located to the right of the line 410 and negative angles may be located to the left of the line. However, it should be noted that positive and negative are relative terms and may be dependent on how the components of the apparatus 100 are arranged. Thus, the values of the angles 406 and 408 discussed herein may be provided as an absolute value. Whether the value is positive or negative may be a function of the orientation of the components of the apparatus 100.

As noted above, current DMDs provide the light input at an angle of +24 degrees. The output of the light may be at 0 degrees. However, when the current DMDs are in an off-state (e.g., the tilt angle of the micromirrors 202 at -12 degrees), the current DMDs may have a high energy absorption of approximately 29%.

In addition, the components of current DMDs may be arranged differently than the apparatus 100 of the present disclosure. For example, the light sources of current DMDs may be located to a side of the arrays of micromirrors and lenses may be located directly above the arrays of micromirrors.

Referring back to FIG. 1, the embodiments of the present disclosure provide a light source 104 that provides the light input 412 at approximately symmetric angles or near symmetric angles. By providing the light input 412 at approximately symmetric angles or near symmetric angles, the DMD of the present disclosure can reduce the energy absorption down to approximately 14%-15% compared to the 29% of current DMD designs. In addition, the peak reflected efficiency of the DMDs of the present disclosure may be maintained around 75% to 80% compared to 77% of current DMD designs. Thus, the DMD of the present disclosure minimizes the thermal load of the array of micromirrors 102 in the off-state, while maintain the power efficiency in the on-state.

In one embodiment, the near symmetric angles may be angles between approximately 5-10 degrees. For example, the angle 406 in FIG. 4 may be approximately +5 degrees to +10 degrees for near symmetric angles. In one example, the near symmetric angle may be approximately 5 degrees. When the input light 412 is received at an angle of +5 degrees, the micromirrors 202 may have a peak reflected efficiency of approximately 80%, an absorption of approximately 11% and an output (or off-axis light output) angle of approximately +19 degrees in an on-state (e.g., the tilt angle 404 may be +12 degrees). The micromirrors 202 may have a peak reflected efficiency of approximately 67%, an absorption of approximately 15% and an output (or off-axis light output) angle of approximately -29 degrees in an off-state (e.g., the tilt angle 404 may be -12 degrees).

In one embodiment, the approximately symmetric angles may be angles between approximately 0-5 degrees. For example, the angle 406 in FIG. 4 may be approximately 0 degrees to +5 degrees for approximately symmetric angles. In one example, the approximately symmetric angle may be approximately 0 degrees. When the input light 412 is received at an angle of 0 degrees, the micromirrors 202 may have a peak reflected efficiency of approximately 75%, an absorption of approximately 14% and an output (or off-axis light output) angle of approximately +24 degrees in an on-state (e.g., the tilt angle 404 may be +12 degrees). The micromirrors 202 may have a peak reflected efficiency of approximately 75%, an absorption of approximately 14% and an output (or off-axis light output) angle of approximately -24 degrees in an off-state (e.g., the tilt angle 404 may be -12 degrees).

As discussed above, in one embodiment, the light source 104 may be coupled to a movable platform 112. The movable platform 112 may rotate, pivot, or move using a mechanical or electromechanical mechanism. The controller 114 may operate, or cause, the movable platform 112 to move to the correct position such that the input light 412 is received by the micromirrors 202 at a desired angle 406 when in the on-state. For example, the movable platform 112 may move the light source 104 to emit the light input 412 to angles between approximately symmetric angles or near symmetric angles (e.g., the angle 406 may be adjusted to between approximately 0-10 degrees).

In another embodiment, the light source 104 may be in a fixed position. Thus, the light source 104 may be fixed to emit the light input 412 at an approximately symmetric angle or at an approximately near symmetric angle.

In one embodiment, the light source 104 may be positioned directly above the array of micromirrors 102. For example, the light source 104 may emit the input light 412 along, or approximately along, the line 410. In contrast, current DMDs may have the light source located to a side of the array of micromirrors or angled relative to the line 410. Moreover, the optic adjuster 106 and the lens 110 may be located off-center (e.g., to the side) of the array of micromirrors 102, unlike current DMD designs.

As noted in the examples above, when the light input 412 is received at angles between approximately 0-10 degrees, the off-axis light output 414 may be reflected at angles that are greater than 0. For example, when the light input 412 is +5 degrees, the off-axis light output 414 may be approximately +19 degrees in the on-state. Similarly, when the light input 412 is 0 degrees, the off-axis light output 414 may be approximately +24 degrees in the on-state.

Due to the off-axis light output, the apparatus 100 may include the optic adjuster 106. The optic adjuster 106 may account for the off-axis light output 414 before emitting the off-axis light output 414 through the lens 110. In one embodiment, the optic adjuster 106 may adjust a field of view (e.g., enlarge the field of view) to adjust the off-axis light output 414. In one embodiment, the optic adjuster 106 may be a free form optic. The free form optic may be an optic that may be various different geometries, have off-axis sections, non-standard shapes, and the like. In one example, the free form optic may have different geometries in a single optic piece for different optic adjustments based on the different angles 408 of the off-axis light output 414. In one example, when the movable platform 112 is used, the optic adjuster 106 may include a plurality of different free form optics that are associated with the different angles 408 of the off-axis light output 414 that can be emitted based on the different angles 406 of the input light 412 that can be received.

Although the optic adjuster 106 and the lens 110 are illustrated as separate components in FIG. 1, it should be noted that the optic adjuster 106 and the lens 110 may be deployed as a single lens system. The lens system may include a variety of different lenses (e.g., reflective, refractive, diffractive, and the like) with different portions that may have different shapes and curves that have off-axis curvature. The single lens system can compensate for the different angles 408 of the off-axis light output 414 with different portions of the single lens system.

In one embodiment, the beam dump 108 may provide light capture for when the array of micromirrors 102 is in an off-state. For example, beam dump 108 may be positioned to capture the off-axis light output 414 when the array of micromirrors 102 is in an off-state. The beam dump 108 may be a dark and cooled component. The beam dump 108 may be cooled via a coolant flowing through the beam dump 108, or other cooling means.

Thus, the apparatus 100 of the present disclosure provides improved energy absorption when the array of micromirrors 102 is in an off-state with a trade-off of adding the optic adjuster 106. However, the cost of the additional component of the optic adjuster 106 may be outweighed by the improvement to the energy absorption, or reduction of thermal load, of the array of micromirrors 102 in the off-state.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus, comprising:
an array of a plurality of micromirrors;
a light source to provide a light input at a near symmetric angle relative to a normal angle of each one of the plurality of micromirrors in the array; and
an optic adjuster to adjust an off-axis light output of the plurality of micromirrors in the array when the plurality of micromirrors is in an on-state.

2. The apparatus of claim 1, wherein the near symmetric angle comprises an angle between approximately 5 degrees to 10 degrees relative to the normal angle of the each one of the plurality of micromirrors.

3. The apparatus of claim 2, wherein the near symmetric angle comprises an angle of approximately 5 degrees relative to the normal angle of the each one of the plurality of micromirrors.

4. The apparatus of claim 1, wherein the optic adjuster comprises a free form optic to adjust a field of view for the off-axis light output that comprises an angle greater than 0 degrees relative to the normal angle.

5. The apparatus of claim 1, further comprising:
a beam dump to collect a light output of the plurality of micromirrors in an off-state.

6. The apparatus of claim 1, further comprising:
a movable platform coupled to the light source to adjust an angle of the light input within a range of angles associated with the near symmetric angle.

7. The apparatus of claim 6, further comprising:
a controller communicatively coupled to the movable platform to move the movable platform to adjust the angle of the light input from the light source to a desired angle.

8. An apparatus, comprising:
an array of a plurality of micromirrors;
a light source to provide a light input at an approximately symmetric angle relative to a normal angle of each one of the plurality of micromirrors in the array; and
an optic adjuster to adjust an off-axis light output of the plurality of micromirrors in the array when the plurality of micromirrors is in an on-state.

9. The apparatus of claim 8, wherein the approximately symmetric angle comprises an angle between approximately 0 degrees to 5 degrees relative to the normal angle of the each one of the plurality of micromirrors.

10. The apparatus of claim 9, wherein the approximately symmetric angle comprises an angle of approximately 0 degrees relative to the normal angle of the each one of the plurality of micromirrors.

11. The apparatus of claim 8, wherein the optic adjuster comprises a free form optic to adjust a field of view for the off-axis light output that comprises an angle greater than 0 degrees relative to the normal angle.

12. The apparatus of claim 8, further comprising:
a beam dump to collect a light output of the plurality of micromirrors in an off-state.

13. The apparatus of claim 8, further comprising:
a movable platform coupled to the light source to adjust an angle of the light input within a range of angles associated with the near symmetric angle.

14. The apparatus of claim 13, further comprising:
a controller communicatively coupled to the movable platform to move the movable platform to adjust the angle of the light input from the light source to a desired angle.

15. An apparatus, comprising:
an array of a plurality of micromirrors;
a light source to provide a light input at an input angle between a range of angles, wherein the range of angles comprises approximately 0 degrees to 10 degrees relative to a normal angle of each one of the plurality of micromirrors in the array; and an optic adjuster to adjust an off-axis light output of the plurality of micromirrors in the array when the plurality of micromirrors is in an on-state.

16. The apparatus of claim 15, wherein the input angle comprises approximately 5 degrees.

17. The apparatus of claim 16, wherein the off-axis light output comprises an angle of approximately 19 degrees.

18. The apparatus of claim 15, wherein the input angle comprises approximately 0 degrees.

19. The apparatus of claim 18, wherein the off-axis light output comprises an angle of approximately 24 degrees.

20. The apparatus of claim 15, further comprising:
a movable platform coupled to the light source to adjust an angle of the light input between the range of angles.

* * * * *